(No Model.) 2 Sheets—Sheet 1.
T. H. HICKS.
DYNAMO ELECTRIC MACHINE.
No. 389,812. Patented Sept. 18, 1888.
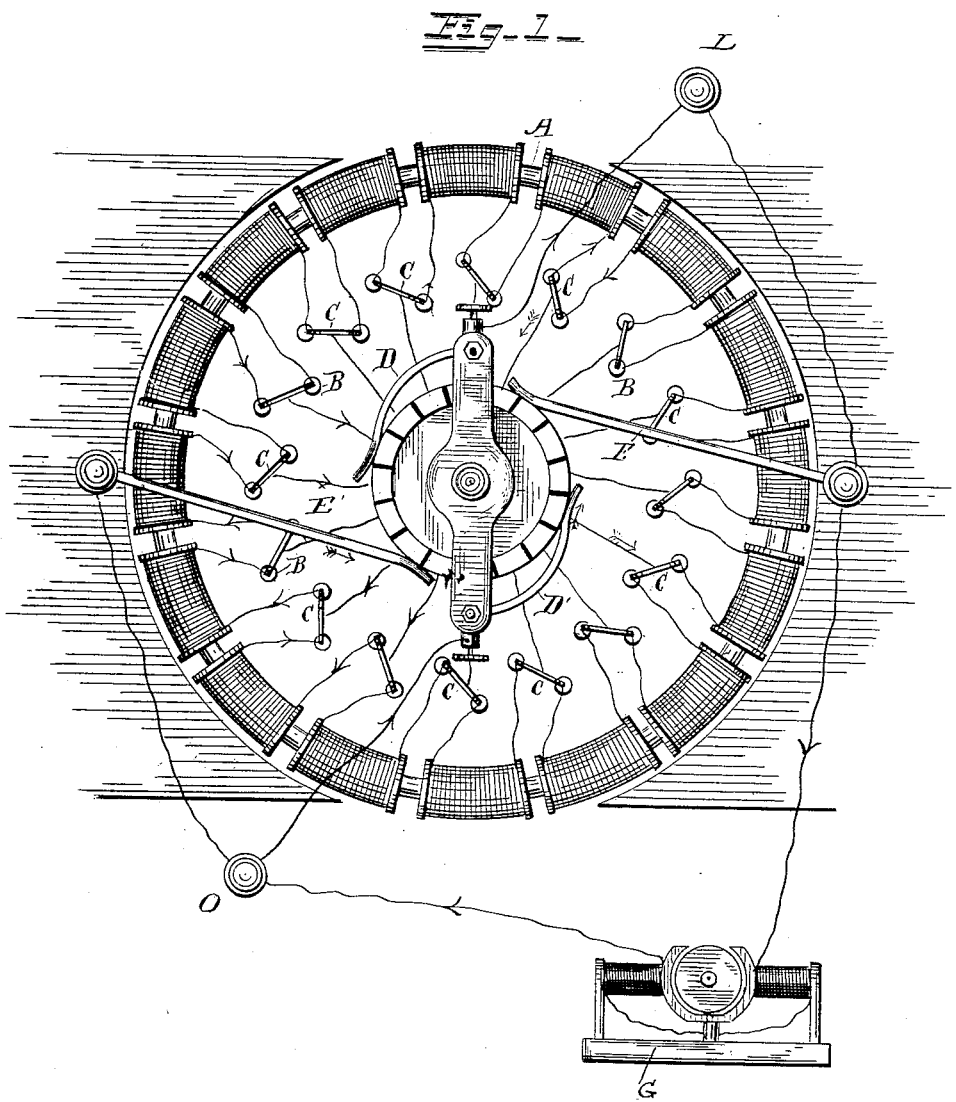
Witnesses
W. T. Robertson
C. H. Raeder
Inventor
Thomas H. Hicks
By his Attorney
T. J. W. Robertson (No Model.) 2 Sheets—Sheet 2.
T. H. HICKS.
DYNAMO ELECTRIC MACHINE.
No. 389,812. Patented Sept. 18, 1888.
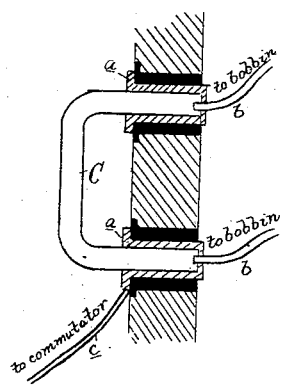
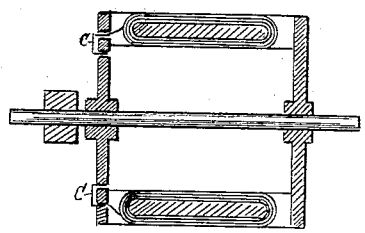
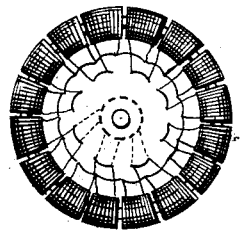
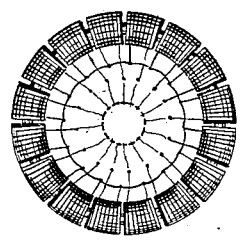
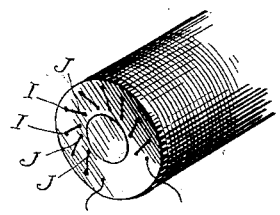
Witnesses
W. T. Robertson
C. H. Raeder
Inventor
Thomas H. Hicks
By his Attorney
T. J. W. Robertson

UNITED STATES PATENT OFFICE.

THOMAS H. HICKS, OF DETROIT, MICHIGAN.

DYNAMO-ELECTRIC MACHINE.

SPECIFICATION forming part of Letters Patent No. 389,812, dated September 18, 1888.

Application filed May 26, 1887. Serial No. 239,447. (No model.)

*To all whom it may concern:*

Be it known that I, THOMAS H. HICKS, of Detroit, in the county of Wayne and State of Michigan, have invented new and useful Improvements in Dynamo-Electric Machines; and I do hereby declare that the following is a full, clear, and exact description thereof, reference being had to the accompanying drawings, which form a part of this specification.

This invention relates to an improvement in dynamo-electric machines, and has for its object the production of an electric generator which will embody in a single organization a structure capable of conversion from a high-tension generator to a low-tension generator, to adapt it to varied uses.

To this end the invention consists in arranging the circuits in the machine so that the windings may be readily coupled in multiple arc or series, as desired, and in providing a double set of brushes, one set being adjustable by hand, so that the current developed may be still further varied by cutting out coils of the armature or field magnet.

In the accompanying drawings, which illustrate the invention, Figure 1 is a diagrammatic view showing the field-magnets and armature in elevation and a motor in the external circuit. Fig. 2 is a sectional view of a part of the armature, showing the manner of coupling its coils. Fig. 3 is a reduced sectional view of the armature. Figs. 4 and 5 are diagrammatic views of several ways of coupling. Fig. 6 is a perspective view of a part of one of the field-magnets and the mode of coupling its coils.

The drawings illustrate a ring-armature having its successive coils or bobbins connected to insulated metallic cups or binding-posts B. These binding-posts are open, so as to form sockets, into which may be inserted the ends of a bridge-piece, C. These binding-posts are preferably arranged in two circumferential rows, as shown in the figures, the two rows being at different radial distances from the axial line of the armature. The cups or posts of the inner series are connected, respectively, to the commutator strips or segments—one cup to each segment. (See Fig. 2.) It will be evident that the coils of the armature may be grouped in different relations by placing bridge-pieces in different orders of arrangement. In Fig. 1 the coils are connected in series, so that, as each segment of the commutator comes under the brush, the current discharges through the successive sections of the armature on each side of the brush, through the brush into the external circuit. The machine is thus generating a current of high electro-motive force.

In case it is desired to couple the coils of the armature in another manner the bridge-pieces are removed from the cups or sockets B and disposed in a different way. For example, in Fig. 4 the successive cups in the inner row are connected by bridge-pieces in pairs, while those in the outer row are all connected. With this disposition it is evident that a pair of bobbins or coils on each side of the armature will be grouped in multiple arc, while all the other coils will be cut out. So in Fig. 5, by arranging the bridge-pieces so as to connect all of the outer cups and having the inner ones disconnected, one coil only on each side of the armature is in circuit at one time, all the others being cut out. The styles of coupling shown in Figs. 4 and 5 are merely instances of the manner in which its connections may be varied, the structure of my apparatus lending itself readily to any aggroupment of the armature-coils. Obviously all of the inner and all of the outer cups might be respectively connected by bridge pieces, or they might be grouped in three or four at a time, the idea being that the cups on the face of the armature are exposed so that an attendant or engineer can couple the coils in the best possible arrangement for any given set of practical conditions. The terminals of the field-magnet coils are likewise connected with cups or binding-posts accessible to an operator, as shown at I I I and J J J in Fig. 6. These coils may also evidently be grouped in series or multiple series, as desired, so as to vary the resistance of the field-magnet circuit or to vary the field-magnet strength.

In addition to the usual pair of commutator-brushes, E E', Fig. 1, I provide the machine with an extra pair of brushes, D D', mounted in a frame, as shown in Fig. 1, so as to turn on a central axis. As shown in Fig. 1, these brushes are electrically connected with the brushes E E'. It will be evident upon inspection of the drawings that the supplemental brushes, D D', cut out all of the armature-coils corresponding to the commutator-segments between them and the main brushes. For example, all of the armature-coils between brushes E' and D' are discharging on short circuit by by reason of the common connection of these brushes with binding-post O. So the coils between E and D are discharging on short circuit by reason of their common connection with binding-post L. The current generated in the other coils, however, discharges into the main circuit, proceeding in a direction indicated by the arrows. It is evident, therefore, that the number of coils cut out may be varied by shifting the supplemental brushes to the right or to the left. In this way both the electro-motive force and the internal resistance of the machine may be varied. Moreover, this adjustment is entirely under control of the attendant while the machine is running. This is often an important desideratum, as the load or work of the machine may vary within wide limits, and it is advantageous to have means within the attendant's control of adjusting the machine accordingly without being obliged to stop it and arrest all work in the supply-circuit.

The field-magnet coils may be coupled in series or shunt relation to the armature in a manner well understood in the art.

It will be evident from the foregoing that the dynamo-electric machine may be adjusted in two ways. The coils of the field-magnet and armature, either or both, will be adjusted to suit the work of the circuit in which the machine is used; but, if during its operation any considerable variation in the current strength should be made evident, the attendant will shift the supplemental brushes until the desired current strength in the discharging-circuit is attained. The coils are coupled and the machine speeded, of course, so that in normal conditions the supplemental brushes will be removed from the main brushes a space covering several commutator-segments, so that the former can be shifted when necessary to vary the current strength.

Having thus described my invention, what I claim as new, and desire to secure by Letters Patent, is—

1. A dynamo-electric machine provided with two sets of commutator-brushes electrically connected with each other, one set being fixed and the other set being manually adjustable, whereby the action of the machine may be varied while in operation.

2. In a dynamo-electric machine, the combination of an armature provided with independent coils, two sets of binding-posts or cups secured to the armature at different radial distances, electric connections between one set and the respective commutator-segments, and bridge-pieces for connecting the cups, whereby the coils may be grouped in series or multiple series, as and for the purpose set forth.

THOS. H. HICKS.

Witnesses:
CHARLES H. LEE,
ADOLPH BARTHEL.